United States Patent [19]

Wu et al.

[11] 4,341,535

[45] Jul. 27, 1982

[54] AMMONIUM SULFATE RECOVERY PROCESS

[75] Inventors: Hsin-Chih Wu, Parma, Ohio; Edward J. Sockell, Port Lavaca, Tex.

[73] Assignee: The Standard Oil Co., Cleveland, Ohio

[21] Appl. No.: 222,190

[22] Filed: Jan. 2, 1981

[51] Int. Cl.³ .............................................. B01D 47/00
[52] U.S. Cl. ........................................ 55/85; 210/634; 210/908; 210/909; 260/465.3; 260/465.9
[58] Field of Search .......................... 55/85, 46, 48, 49; 203/14; 260/465.3, 465.9; 210/634, 908, 909

[56] References Cited

U.S. PATENT DOCUMENTS

| | | |
|---|---|---|
| 3,134,726 | 5/1964 | Hochgraf ................................ 55/48 |
| 3,149,055 | 9/1964 | Hougland ............................... 203/14 |
| 3,661,723 | 5/1972 | Ohashi et al. ...................... 260/465.9 |
| 3,734,943 | 5/1973 | Fitzgibbons et al. ............. 260/465.3 |
| 3,876,508 | 4/1975 | Bonnema et al. ................. 260/465.3 |
| 3,885,928 | 5/1975 | Wu .......................................... 55/85 |
| 3,895,050 | 7/1975 | Sheely ............................... 260/465.3 |
| 3,896,007 | 7/1975 | Rescalli et al. ................... 260/465.3 |
| 4,015,946 | 4/1977 | Bonnema et al. ................. 260/465.3 |
| 4,234,510 | 11/1980 | Wu .................................... 260/465.3 |

*Primary Examiner*—Bernard Nozick
*Attorney, Agent, or Firm*—John E. Miller, Jr.; Herbert D. Knudsen; Larry W. Evans

[57] ABSTRACT

The heavy organic material contained in the liquid bottoms from the quench column of an acrylonitrile recovery and purification system is extracted therefrom using acetonitrile as the extractant.

6 Claims, 1 Drawing Figure

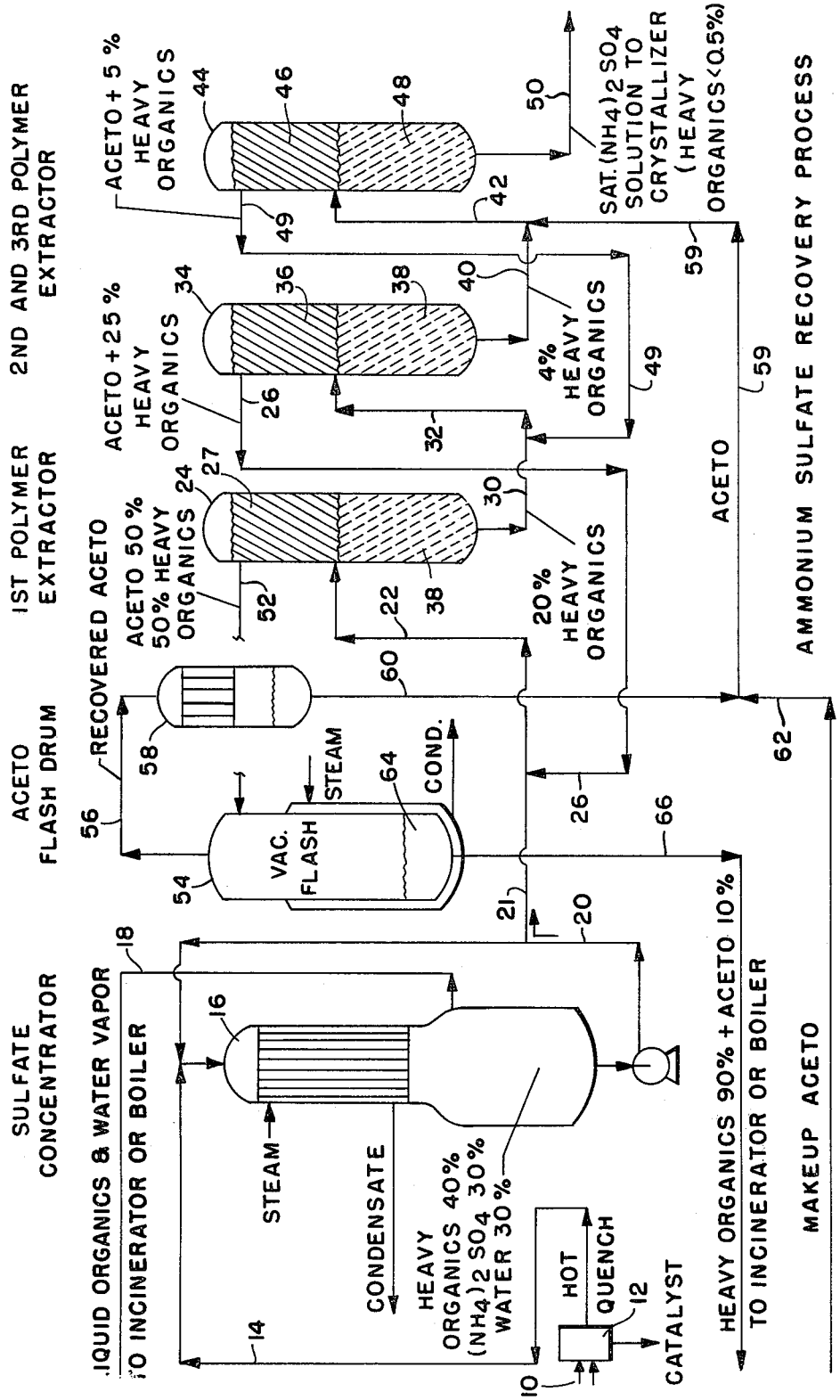

AMMONIUM SULFATE RECOVERY PROCESS

BACKGROUND OF THE INVENTION

U.S. Pat. No. 3,885,928, the disclosure of which is incorporated herein by reference, describes a recovery and purification system for processing the reactor effluent produced in the ammoxidation of propylene or isobutylene to produce acrylonitrile or methacrylonitrile. This system employs a quench column in which the hot gaseous reactor effluent is cooled by direct contact with water. As a result of this procedure, a liquid byproduct is produced which is continuously withdrawn from the bottom of the quench column.

This quench bottoms byproduct typically contains on the order of 10 weight percent ammonium sulfate, 16 weight percent of a heavy organic material, a slight amount of light organics and the balance (about 74%) water. Because of the heavy organic material which is composed of a mixture of different high-boiling organic compounds having a high degree of nitrile substitution and also containing some oxygenated hydrocarbon groups, the quench tower bottoms is essentially useless. Hence, it is usually disposed of either by burning or by deep welling.

Unfortunately, both of these disposal methods are becoming less and less attractive. With the increasing costs of fuel, burning of the quench tower bottoms becomes increasingly expensive. Moreover, burning is environmentally objectionable because of sulfur dioxide emissions. Deep welling is also objectionable from an environmental standpoint.

Accordingly, it is an object of the present invention to provide a new technique for disposing of the quench tower bottoms produced by an acrylonitrile or methacrylonitrile purification and recovery unit.

SUMMARY OF THE INVENTION

This and other objects are accomplished by the present invention which is based on the discovery that the heavy organic material contained in the quench tower bottoms can be easily and inexpensively extracted therefrom by contacting the quench tower bottoms with acetonitrile. Once the heavy organic material is separated from the quench tower bottoms, the purified quench tower bottoms constitutes an ideal source for fertilizer-grade ammonium sulfate. The extracted heavy organic material, after recovery of acetonitrile therefrom, is then discharged to a boiler for steam generation or to an incinerator. Because the heavy organic material is much more concentrated, disposal by incineration is much cheaper.

Thus, the present invention provides a novel process for treating the quench tower bottoms produced by an acrylonitrile or methacrylonitrile purification and recovery unit to facilitate disposal thereof, the quench tower bottoms containing water, ammonium sulfate and a heavy organic material, the process comprising contacting the quench tower bottoms with acetonitrile to extract the heavy organic material therefrom.

BRIEF DESCRIPTION OF THE DRAWING

The sole FIGURE is a schematic illustration of the preferred mode of recovering ammonium sulfate from the hot quench bottoms produced in an acrylonitrile plant.

DETAILED DESCRIPTION

Referring to the FIGURE, hot quench tower bottoms, such as those recovered in line 16 of the figure in U.S. Pat. No. 3,885,928, are fed via line 10 to a catalyst settler 12 wherein any particulate catalyst entrained therein is allowed to settle out. The hot quench bottoms are then fed via line 14 to sulfate concentrator 16 where they are heated preferably by steam, to remove water and light organics.

Although acetonitrile will readily extract the heavy organic material from the quench tower bottoms at any ammonium sulfate concentration, the tendency of acetonitrile to dissolve in the aqueous quench tower bottoms decreases as the ammonium sulfate concentration in the quench tower bottoms increases. Accordingly, it is preferable that the quench tower bottoms be as concentrated in ammonium sulfate as possible during the extraction procedure. Sulfate concentrater 16, therefore, is provided to reduce the water content of the quench tower bottoms to an appropriate level. Preferably, the quench tower bottoms are concentrated to an ammonium sulfate concentration of at least 40%, preferably 85% to 98%, of the saturated value. Optimally, the quench tower bottoms are concentrated to as near the saturation concentration as possible in practical operation.

The water vapor and light organics produced during concentrating in sulfate concentrater 16 are discharged through line 18. The concentrated quench tower bottoms, now having a concentration of approximately 40% heavy organic material, 30% ammonium sulfate and 30% water are transferred via line 20, 21, 22 to first extracter 24. A solution of about 25% heavy organic material in acetonitrile in line 26 is also charged via lines 21, 22 into extracter 24, the concentrated hot quench bottoms and the acetonitrile/heavy organic material solution undergoing significant mixing in lines 21, 22.

In extracter 24, the concentrated hot quench bottoms/acetonitrile solution mixture in line 22 separates into two phases. Upper phase 27 contains approximately 50% acetonitrile and 50% heavy organic material while lower phase 28 contains approximately 20% heavy organic material and 80% liquid, the liquid being composed of approximately 52% water and 48% ammonium sulfate.

Lower phase 28 from extracter 24 is discharged from the bottom of the extracter and transferred via lines 30 and 32 to second extracter 34. A solution of approximately 5% heavy organic material in acetonitrile from line 36 is also transferred to extracter 34 via line 32, significant mixing of the two liquids occurring in line 32. In second extracter 34, the mixture from line 32 separates into two phases, an upper organic phase 36 containing approximately 25% heavy organic material dissolved in acetonitrile and a lower phase 38 containing approximately 4% heavy organic material and 96% liquid, the liquid again containing 52% water and 48% ammonium sulfate.

Lower phase 38 from extracter 34 is then discharged from the bottom of the extracter and transferred via lines 40 and 42 to third extracter 44. Acetonitrile containing essentially no heavy organic material from line 46 is also transferred to third extracter 44 via line 42, significant mixing of the organic and aqueous phases occurring in line 42. In third extracter 44, the mixture in line 42 again separates into two phases, the upper organic phase 46 comprising approximately 5% heavy organic material dissolved in acetonitrile and the lower phase 48 containing approximately 1% heavy organic material and 99% liquid, the liquid again containing 52% water and 48% ammonium sulfate. The purified lower phase 48 is withdrawn from the bottom of extracter 44 and transferred via line 50 to a crystallizer (not shown) for removing water and forming crystallized ammonium sulfate suitable for use as a fertilizer.

Upper phase 46 in extracter 44 comprising about 5% heavy organic material dissolved in acetonitrile serves as the extractant in second extracter 34 and for this purpose is transferred via line 36 to line 32 and second extracter 34 as previously described. In a similar fashion, upper phase 36 produced in second extracter and comprising about 25% heavy organic material dissolved in acetonitrile serves as the extractant in first extracter 24 and for this purpose is transferred via line 26 to line 22 and first extracter 24 as previously described. The upper phase produced in first extracter 24, which comprises approximately 50% acetonitrile and 50% heavy organic material is transferred via line 52 to vacuum flash drum 54 where the acetonitrile therein is distilled off through line 56, condensed in condenser 58 and transferred via lines 60, 46 and 42 to third extracter 44 for the final extraction process. Makeup acetonitrile is also added to line 46 through line 62. Heavy organic material solution 64 collected in the bottom of flash drum 54, which contains about 90% heavy organic material and 10% acetonitrile is discharged to waste via line 66.

As can be seen from the above description, the amount of waste which must be disposed of such as by incineration is reduced to only a small fraction of the total amount of hot quench bottoms. This means that the costs of waste disposal are drastically reduced. In addition, since the ammonium sulfate is not burned, sulfur dioxide pollution is also eliminated. Also, ammonium sulfate can be recovered and sold for profit. Thus, it can be seen that the inventive process is a simple, easy and economic way of disposing of the hot quench bottoms produced from an acrylonitrile or methacrylonitrile purification and recovery unit.

Although only one embodiment of the invention has been described above, many modifications can be made without departing from the spirit and scope of the invention. All such modifications are intended to be included within the scope of of the present invention, which is to be limited only by the following claims:

We claim:

1. A process for treating the quench tower bottoms produced by an acrylonitrile or methacrylonitrile purification and recovery unit to facilitate disposal thereof, said quench tower bottoms containing water, ammonium sulfate and a heavy organic material, said process comprising contacting said quench tower bottoms with acetonitrile to extract the heavy organic material therefrom by liquid phase extraction.

2. A process for treating the quench tower bottoms produced by an acrylonitrile or methacrylonitrile purification and recovery unit to facilitate disposal thereof, said quench tower bottoms containing water, ammonium sulfate and heavy organic material, said process comprising concentrating said quench tower bottoms so that said quench tower bottoms are at least 50% saturated in ammonium sulfate and thereafter contacting said quench tower bottoms with acetonitrile to extract the heavy organic material therefrom.

3. The process of claim 2 wherein said quench tower bottoms are concentrated to at least 90% of saturation in ammonium sulfate.

4. The process of claim 2 wherein polymer is extracted from the concentrated quench tower bottoms in a plurality of extraction stages operated countercurrently.

5. The process of claim 4 wherein the last extraction stage in said plurality of extraction stages produces an organic phase comprising heavy organic material dissolved in acetonitrile and an aqueous phase comprising ammonium sulfate dissolved in water, said process further comprising recovering said aqueous phase and separating water from said aqueous phase to produce solid ammonium sulfate.

6. The process of claim 5 wherein said quench tower bottoms are concentrated to at least 85% of saturation in ammonium sulfate.

* * * * *